May 30, 1939.  F. W. SEYBOLD  2,160,110
COMPOSING ROOM SAW
Original Filed May 21, 1936
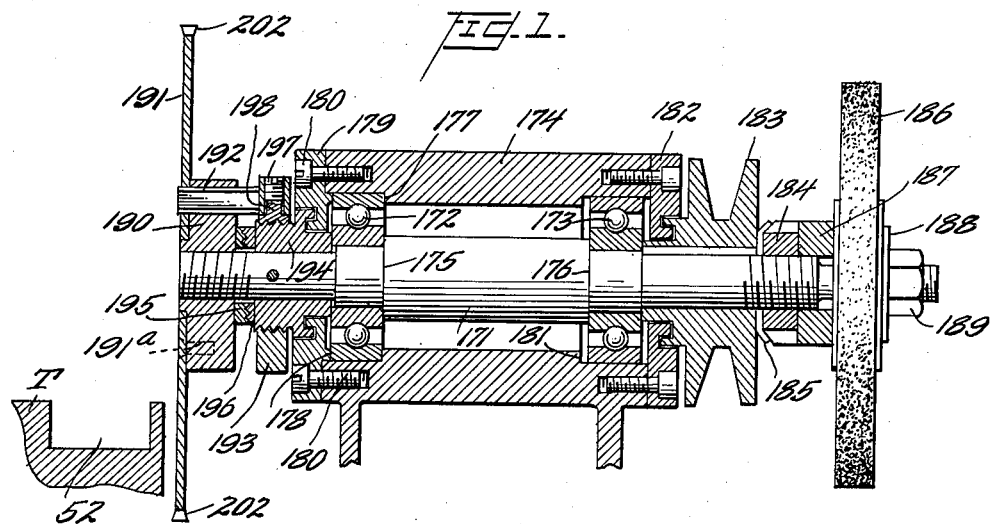
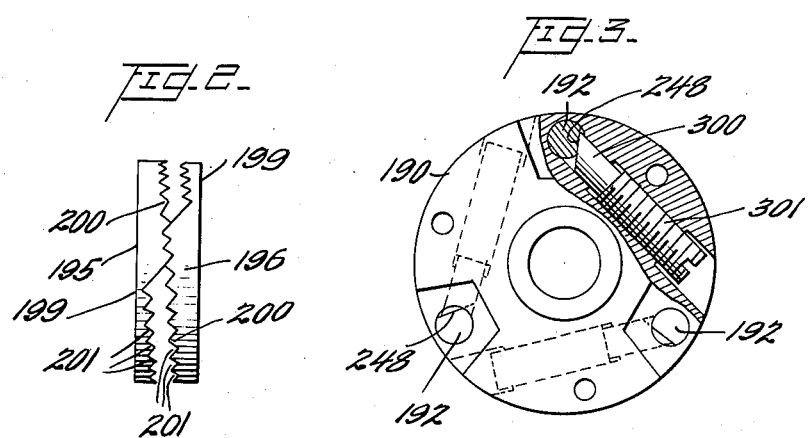
Inventor
*Frederick W. Seybold,*
By *Watson, Cole, Grindle & Watson*
Attorney Patented May 30, 1939

2,160,110

UNITED STATES PATENT OFFICE 2,160,110

COMPOSING ROOM SAW

Frederick W. Seybold, Westfield, N. J., assignor to American Type Founders Incorporated, Elizabeth, N. J., a corporation of New Jersey Original application May 21, 1936, Serial No. 81,069. Divided and this application March 12, 1937, Serial No. 130,605

4 Claims. (Cl. 29—69)

The present invention relates to metal saws and more particularly to composing room saws.

An object is to provide an improved saw assembly with means to positively position the saw axially and also means to adjust all of the trimmer knives simultaneously the same amount.

Other objects and features of novelty will be apparent from the description taken in connection with the drawing, in which, Fig. 1 is a sectional elevation through the saw, driven pulley, and grinding wheel assembly;

Fig. 2 is a plan view of the two cam washers employed in connection with adjusting the trimmer knives and saw; and Fig. 3 is a side elevation of the saw hub.

The saw assembly includes a shaft or spindle 171, rotatively mounted by means of the ball-bearings 172 and 173 in the casing or housing 174 carried by the top member of the pedestal. The ball-bearings 172 and 173 abut shoulders 175 and 176 respectively, on the shaft. The outer race of bearing 172 on one side abuts the shoulder 177 within the housing and on the other a shoulder 178 on the oil seal 179 secured to the end of the housing as by cap screws 180. The outer race of bearing 173 has a slight play between shoulder 181 in the housing and the oil seal 182, thus allowing for expansion and contraction.

The driven pulley 183 is keyed to the shaft 171 and has one end of its hub abutting the inner race of bearing 173. Proper running clearance is obtained by adjustment of the nut 184 and lock washer 185, the nut being threaded on the shaft 171. The grinding wheel 186 is mounted at the right end of the shaft between the collar 187 and washer 188 being clamped between these parts by the nut 189 threaded on the end of the shaft.

The saw hub 190 having the saw 191 secured thereto as by the countersunk screws 191ª is threaded on the left hand end of the shaft 171 by a left handed thread when viewing the saw from the left of Fig. 1. The hub 190 carries the trimmer knives 192 which extend through the same, the cutting ends being located at the left as viewed in Fig. 1, the opposite or non-cutting ends abutting a nut 193 threaded on the collar 194 pinned to the shaft 171. The function of the nut 193 is to adjust all of the knives simultaneously and a uniform amount, the knives having been ground to equal length so that each knife will perform its share of the work in the trimming operation. The nut 193 may be locked to the collar 194 by set screw 197 acting on the shoe 198.

Interposed between the hub 190 of the saw and the collar 194 are two cam washers 195 and 196. The cam or wedge washers are reversed with respect to each other and each comprises a flat face 199 and a wedge or helical face 200 formed with radial V-shaped teeth 201. The distance between the faces 199 of the washers may be adjusted by turning one with respect to the other. After the adjustment has been made the interengagement of the teeth 201 maintains the same.

The function of these wedges is to permit the positioning of the saw blade 191 so that the trimmer knives 192 will protrude only a definite amount, say ¼ point, beyond the swaged teeth 202 of the saw, so as to keep the amount of material to be removed by the trimmer knives at a minimum. As the swaging of the teeth wears, an increased amount of material would have to be removed by the trimmer knives 192, and to overcome this the circular wedges 195 and 196 may be adjusted so that the saw blade is moved toward the left as viewed in Fig. 1. Thus, the saw cut and trimmer knife cut may be adjusted for the best results.

Trimmer knives are nearly semi-cylindrical in form having a slabbed off portion providing a flat surface 248. After the knives have been adjusted to project the proper amount, any suitable means may be provided for properly holding the cutting edge from turning. Thus, referring to Fig. 3, a knife 192 is shown in one of the apertures of the hub with which a locking means co-operates, consisting of the plug 300 forced against the flat or slabbed off side of the knife by the screw 301 extending in a direction parallel to a tangent to the outside surface of the hub.

Although the invention has been described in detail, it is to be understood that it is not limited to the single modification shown but includes other modifications and changes coming within the scope of the appended claims.

This application is a division of my application Serial No. 81,069, filed May 21, 1936.

Having thus described the invention, what is claimed as new and desired to be secured by Letters Patent is:

1. In a machine of the character described, a saw and trimmer knife assembly including in combination, a shaft, a bearing on the machine rotatively supporting said shaft, a saw having its hub threaded on one end of said shaft, an externally threaded collar secured to said shaft, means disposed between said hub and collar to hold the hub at a definite selective adjusted position axially of the shaft, a nut on said externally threaded collar, and trimmer knives extending axially through said hub having their inner ends abutting said nut.

2. In a machine of the character described, a saw and trimmer knife assembly including in combination, a shaft, a bearing on the machine for said shaft, a saw having its hub threaded on an end of said shaft by a left handed thread when looking toward said end, the saw constructed to cut only on rotation in a clockwise direction, an abutment rigid with the shaft spaced from said hub, cam washers between said abutment and hub adapted to hold the hub at a definite axial position on the shaft, trimmer knives extending axially through said hub and means to advance all of the knives simultaneously the same amount.

3. The machine according to claim 2 wherein the cam faces of the washers are serrated.

4. The machine according to claim 2 wherein said means includes two washers, the contacting adjacent faces of which are serrated and helical.

FREDERICK W. SEYBOLD.